United States Patent
Ishihara et al.

(10) Patent No.: US 9,919,923 B2
(45) Date of Patent: Mar. 20, 2018

(54) METHOD FOR PRODUCING HYDROGEN PEROXIDE

(71) Applicants: MITSUBISHI GAS CHEMICAL COMPANY, INC., Chiyoda-ku (JP); KYUSHU UNIVERSITY, NATIONAL UNIVERSITY CORPORATION, Fukuoka-shi (JP)

(72) Inventors: Tatsumi Ishihara, Fukuoka (JP); Kohei Shigeta, Katsushika-ku (JP); Katsuhiro Iura, Katsushika-ku (JP); Kenji Kato, Chiyoda-ku (JP); Norikazu Okuda, Chiyoda-ku (JP)

(73) Assignees: MITSUBISHI GAS CHEMICAL COMPANY, INC., Chiyoda-ku (JP); KYUSHU UNIVERSITY, NATIONAL UNIVERSITY CORPORATION, Fukuoka-shi (JP)

( * ) Notice: Subject to any disclaimer, the term of this patent is extended or adjusted under 35 U.S.C. 154(b) by 82 days.

(21) Appl. No.: 14/413,251

(22) PCT Filed: Jun. 17, 2013

(86) PCT No.: PCT/JP2013/066566
§ 371 (c)(1),
(2) Date: Jan. 7, 2015

(87) PCT Pub. No.: WO2014/010372
PCT Pub. Date: Jan. 16, 2014

(65) Prior Publication Data
US 2015/0139892 A1    May 21, 2015

(30) Foreign Application Priority Data
Jul. 10, 2012 (JP) .................. 2012-154206

(51) Int. Cl.
| C01B 15/029 | (2006.01) |
| B01J 21/06 | (2006.01) |
| B01J 23/38 | (2006.01) |
| B01J 37/02 | (2006.01) |
| B01J 23/66 | (2006.01) |

(52) U.S. Cl.
CPC .......... *C01B 15/029* (2013.01); *B01J 21/063* (2013.01); *B01J 23/38* (2013.01); *B01J 23/66* (2013.01); *B01J 37/0203* (2013.01)

(58) Field of Classification Search
CPC .................................................. C01B 15/029
USPC ........................................................ 423/584
See application file for complete search history.

(56) References Cited

U.S. PATENT DOCUMENTS

| 3,336,112 A | 8/1967 | Hooper |
| 3,361,533 A | 1/1968 | Hooper |
| 4,900,468 A | 2/1990 | Mitchell et al. |
| 5,236,692 A | 8/1993 | Nagashima et al. |
| 5,496,532 A | 3/1996 | Monzen et al. |
| 6,447,743 B1 | 9/2002 | Devic et al. |
| 6,500,969 B1 | 12/2002 | Zhou et al. |
| 6,566,320 B1 * | 5/2003 | Chiaradonna ........ C11D 3/0084 252/186.38 |
| 7,537,857 B2 * | 5/2009 | Andrews ............. H01M 4/8605 429/483 |
| 2003/0198739 A1 * | 10/2003 | Mager .................... B29C 33/64 427/235 |
| 2005/0276744 A1 | 12/2005 | Haas et al. |
| 2009/0317349 A1 | 12/2009 | Zaeska et al. |

FOREIGN PATENT DOCUMENTS

| JP | 40 19006 | 8/1965 |
| JP | 5 213607 | 8/1993 |
| JP | 2001-510881 A | 8/2001 |
| JP | 2002 503617 | 2/2002 |
| JP | 3394043 | 4/2003 |
| JP | 2003-321337 A | 11/2003 |
| JP | 2004-529986 A | 9/2004 |
| JP | 2007 537119 | 12/2007 |
| JP | 2011 524911 | 9/2011 |
| WO | 2012 133149 | 10/2012 |

OTHER PUBLICATIONS

Extended European Search Report dated Mar. 30, 2016 in Patent Application No. 13817567.4.
Shigeta, K. et al., "TiO$_2$ Tanji Pd—Au Shokubai ni yoru H$_2$kara no Chokusetsu H$_2$O$_2$ Gosei", Dai 105 Kai Shokubai Toronkai Toronkai A Yokoshu, p. 123, (Mar. 24, 2010).
"Radical Hosokuzai", Heisei 14 Nendo Hyojun Gijutsushu (Hikari Shokubai (Kihon Genri)), pp. 1-2, (Mar. 28, 2003).
International Search Report dated Sep. 17, 2013 in PCT/JP13/066566 filed Jun. 17, 2013.
Office Action dated Jun. 24, 2016 in Japanese Patent Application No. 2012-154206 (with unedited computer generated English translation).

* cited by examiner

*Primary Examiner* — Melissa S Swain
(74) *Attorney, Agent, or Firm* — Oblon, McClelland, Maier & Neustadt, L.L.P.

(57) ABSTRACT

An object of the present invention is to provide a method by which hydrogen peroxide can be produced at a satisfactory level from an industrial and economical viewpoint without causing the load of purification to be large and without needing too large facilities for production. The present invention is directed to a method for producing hydrogen peroxide, which comprises reacting hydrogen and oxygen in a reaction medium in the presence of a noble metal catalyst and a radical scavenger.

18 Claims, No Drawings

METHOD FOR PRODUCING HYDROGEN PEROXIDE

FIELD OF THE INVENTION

The present invention relates to a method for producing hydrogen peroxide by directly reacting hydrogen and oxygen in the presence of a radical scavenger.

BACKGROUND ART

Hydrogen peroxide has an oxidizing power such that it exhibits strong bleaching and germicidal actions. Therefore, hydrogen peroxide is utilized as a bleaching agent for, for example, paper, pulp, and fibers, or as a germicide. Further, hydrogen peroxide is an important industrial product widely used in oxidation reactions including epoxidation and hydroxylation.

Further, hydrogen peroxide is used in the semiconductor industry, specifically used in, for example, cleaning of the surfaces of semiconductor substrates and the like, chemical polishing of the surfaces of copper, tin, and other copper alloys, and etching for electronic circuit. Hydrogen peroxide produces only water and oxygen as decomposition products, and hence is considered important from the viewpoint of green chemistry, and has attracted attention as a substitute material for a chlorine bleaching agent.

Conventionally, as a method for producing hydrogen peroxide, for example, an anthraquinone method, an electrolytic method, and a method using oxidation of isopropyl alcohol have been known, and the anthraquinone method is industrially mainly employed. The anthraquinone method, however, is a method comprising many steps, such as hydrogenation of anthraquinone, oxidation by air, extraction with water of the formed hydrogen peroxide, further, purification and concentration. Thus, this method requires high plant investment and uses a large amount of energy, and further causes emission of an organic solvent used for dissolving anthraquinone to the atmosphere, and hence is not an ideal method for producing hydrogen peroxide.

As a method for solving the above problems, there is a method for directly producing hydrogen peroxide from oxygen and hydrogen in a reaction medium using a catalyst. For example, there has been proposed a method in which hydrogen and oxygen are contacted with a solid catalyst containing gold, platinum, or palladium as a metal component in a liquid phase in the presence of water, an acid, and a non-acidic oxygen-containing organic compound to produce hydrogen peroxide, and it is known that hydrogen peroxide is formed by this method in a certain yield (patent document 1).

In the method in which hydrogen peroxide is directly produced from oxygen and hydrogen using a noble metal catalyst, the catalyst functions also as a catalyst for decomposition of hydrogen peroxide, and therefore decomposition of the formed hydrogen peroxide simultaneously occurs. For this reason, in such a method, a compound for inhibiting the decomposition is generally used, and patent document 1 proposes that, in addition to the above-mentioned non-acidic oxygen-containing organic compound, ions such as sulfuric acid ions, chlorine ions, or bromine ions are present in a liquid phase of the reaction medium.

Patent document 2 discloses a method for catalytically producing hydrogen peroxide from hydrogen and oxygen in a reaction medium using a platinum group metal catalyst supported on an oxide carrier. This patent document reports that water is generally preferred as the reaction medium, and that, for inhibiting decomposition of the formed hydrogen peroxide, for example, an aqueous hydrochloric acid solution, an aqueous hydrobromic acid solution, an aqueous phosphoric acid solution, or an aqueous sulfuric acid solution can be preferably used, particularly, an aqueous hydrochloric acid solution or an aqueous hydrobromic acid solution can be preferably used. In addition, there is a description that, instead of the aqueous hydrochloric acid solution, a combination of an aqueous solution mixture of sodium chloride, potassium chloride or the like as a chloride ion component and sulfuric acid, phosphoric acid or the like as a hydrogen ion component, can be preferably employed. Further, there is a description that, instead of the aqueous hydrobromic acid solution, a combination of an aqueous solution mixture of sodium bromide, potassium bromide as a bromide ion component and sulfuric acid, phosphoric acid or the like as a hydrogen ion component, can be preferably employed.

Patent document 3 proposes a method for directly producing an aqueous hydrogen peroxide solution from hydrogen and oxygen in an agitator type reactor, wherein hydrogen and oxygen are separately in the form of small bubbles and preliminarily acidic by adding an inorganic acid thereto, and the molar ratio between the amounts of hydrogen and oxygen introduced is constant. This patent document has a description showing that the aqueous reaction medium can contain a stabilizer for hydrogen peroxide (e.g., a phosphonate or tin) and an inhibitor of decomposition of hydrogen peroxide (e.g., a halide). Further, this patent document has a description showing that, among the halides, a bromide is an especially preferred inhibitor of decomposition, and a combination with free bromine ($Br_2$) is advantageously used.

Patent document 4 discloses a method for producing an organic hydrogen peroxide solution or an aqueous organic hydrogen peroxide solution by a direct synthesis method, wherein a non-explosive gas mixture containing hydrogen and oxygen and a liquid reaction medium are passed through a fixed bed comprising a mixture containing a noble metal catalyst. Further, this patent document discloses that the liquid reaction medium contains a strong acid and a halide.

Patent document 5 discloses a direct synthesis method of an aqueous solution of hydrogen peroxide from hydrogen and oxygen in a three-phase system using a heterogeneous catalytic action, wherein the reaction proceeds directly on the surface of a solid heterogeneous catalyst in a particulate form suspended in a liquid aqueous phase, and the catalyst comprises pure palladium or a metal compound selected from combinations of palladium and at least one noble metal other than palladium. Further, this patent document discloses that, in this method, the metal compound is supported on a carrier comprising at least one compound selected from zirconium dioxide and superacidic zirconium dioxide, and that the liquid aqueous phase contains therein bromide ions at a concentration of 0.05 to 3 mmol/liter, based on the aqueous phase, and has a pH in the range of from 0 to 4.

PRIOR ART REFERENCES

Patent Documents

Patent document 1: Japanese Examined Patent Publication No. Sho 40-19006

Patent document 2: Japanese Patent No. 3394043

Patent document 3: Japanese Laid Open Patent Publication (kohyo) No. 2002-503617

Patent document 4: Japanese Laid Open Patent Publication (kohyo) No. 2007-537119

Patent document 5: Japanese Laid Open Patent Publication (kokai) No. Hei 05-213607

SUMMARY OF THE INVENTION

Problems to be Solved by the Invention

The above-mentioned conventional direct production method for hydrogen peroxide mainly employs a method in which halogen ions are used and present in the reaction medium to inhibit decomposition of the formed hydrogen peroxide, improving the yield of hydrogen peroxide, although the mechanisms of the action of the halogen ions have not yet been elucidated.

However, when hydrogen peroxide is produced using halogen ions, the halogen ions must be removed from the produced hydrogen peroxide before shipping it as a product. Particularly, in the production of hydrogen peroxide for use in the application of ultrapure hydrogen peroxide for semiconductor, the load of purification of the product is large, and too large facilities for production are needed. Further, depending on the concentration of halogen ions, stainless steel or the like which is a structural material for the reaction apparatus may suffer corrosion.

As apparent from the above, the industrial production method for hydrogen peroxide using halogen ions as an inhibitor of decomposition has various limitations and has not achieved a level satisfactory from an economical viewpoint.

Accordingly, an object of the present invention is to provide a method by which hydrogen peroxide can be produced at a satisfactory level from an industrial and economical viewpoint without causing the load of purification to be large and without needing too large facilities for production.

Means to Solve the Problems

The present inventors have made extensive and intensive studies, with a view toward solving the above-mentioned problems, on a compound other than halogens having an inhibition effect for decomposition of hydrogen peroxide. As a result, it has been found that a radical scavenger is effective in inhibition of the decomposition of hydrogen peroxide and can be used as a substitute for halogens, and the present invention has been completed.

Specifically, the above-mentioned problems can be solved by the following present invention.

<1> A method for producing hydrogen peroxide, which comprises reacting hydrogen and oxygen in a reaction medium in the presence of a noble metal catalyst and a radical scavenger.

<2> The method for producing hydrogen peroxide according to item <1> above, wherein the radical scavenger is a nitrone compound, a nitroso compound, a dithiocarbamate derivative, or an ascorbic acid derivative.

<3> The method for producing hydrogen peroxide according to item <1> or <2> above, wherein the radical scavenger is a nitrone compound represented by the following general formula (1), (2), or (3), a nitroso compound represented by the following general formula (4), a dithiocarbamate derivative represented by the following general formula (5), or a compound represented by the following formula (6):

[Chemical formula 1]

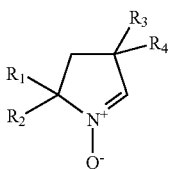

(1)

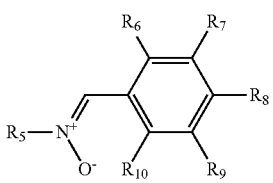

(2)

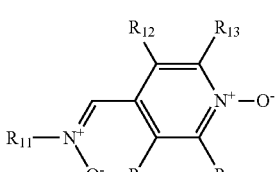

(3)

[Chemical formula 2]

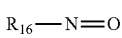

(4)

[Chemical formula 3]

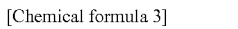

(5)

[Chemical formula 4]

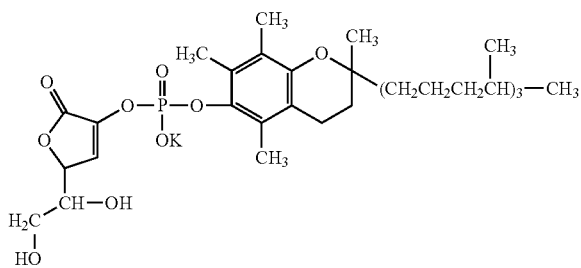

(6)

wherein, in the general formula (1), $R_1$ and $R_2$ are each independently an alkyl group having 1 to 10 carbon atoms and optionally having a branch, a phosphoric acid group, or a phosphate group, and $R_3$ and $R_4$ are each independently hydrogen, an alkyl group having 1 to 10 carbon atoms and optionally having a branch, an alkyl group having 1 to 10 carbon atoms optionally having a branch and optionally being substituted with a hydroxyl group or an amino group, a 2-oxo-1-pyridylmethyl group, or an amino group, in the general formula (2), $R_5$ is an alkyl group having 1 to 10 carbon atoms and optionally having a branch, and $R_6$ to $R_{10}$ are each independently hydrogen or an alkyl group having 1 to 10 carbon atoms and optionally having a branch, in the general formula (3), $R_{11}$ is an alkyl group having 1 to 10 carbon atoms and optionally having a branch, and $R_{12}$ to $R_{15}$ are each independently hydrogen or an alkyl group having 1 to 10 carbon atoms and optionally having a branch, in the general formula (4), $R_{16}$ is an alkyl group having 1 to 10 carbon atoms and optionally having a branch; or an aryl group having 6 to 20 carbon atoms and optionally being substituted with an alkyl group having 1 to 10 carbon atoms and optionally having a halogen, a sulfonic acid group, or a branch, and in the general formula (5), $R_{17}$ and $R_{18}$ are each independently an alkyl group having 1 to 10 carbon atoms optionally having a branch and optionally being substituted with a hydroxyl group, or a carboxyalkyl group having 1 to 10 carbon atoms and optionally having a branch, and $X^+$ is a cation.

<4> The method for producing hydrogen peroxide according to item <3> above, wherein, in the general formula (1), $R_1$ and $R_2$ are methyl groups, and $R_3$ and $R_4$ are each independently a methyl group, hydrogen, a 2-oxo-1-pyridylmethyl group, or an amino group, in the general formula (2), $R_5$ is a methyl group, an ethyl group, an isopropyl group, a n-propyl group, a cyclopropyl group, a n-butyl group, a sec-butyl group, a tert-butyl group, or a cyclobutyl group, and $R_6$ to $R_{10}$ are hydrogen, in the general formula (3), $R_{11}$ is a tert-butyl group, and $R_{12}$ to $R_{15}$ are hydrogen, in the general formula (4), $R_{16}$ is a tert-butyl group, a 3,5-dibromo-1-sulfophenyl group, or a 2,3,5,6-tetramethylphenyl group, and in the general formula (5), $R_{17}$ and $R_{18}$ are each independently a methyl group, an ethyl group, or a carboxymethyl group, and $X^+$ is a sodium ion.

<5> The method for producing hydrogen peroxide according to any one of items <1> to <4> above, wherein the radical scavenger is 5,5-dimethyl-1-pyrroline N-oxide or N-tert-butyl-α-phenylnitrone.

<6> The method for producing hydrogen peroxide according to any one of items <1> to <5> above, wherein the amount of the radical scavenger used is 0.01 to 0.05 part by weight, relative to 100 parts by weight of the reaction medium.

<7> The method for producing hydrogen peroxide according to any one of items <1> to <6> above, wherein the noble metal catalyst is a catalyst comprising silica, alumina, silica-alumina, titanium oxide, or zirconia oxide having supported thereon at least one metal selected from the group consisting of platinum, palladium, silver, and gold.

Effect of the Invention

The production method of the present invention is advantageous in that, by using a radical scavenger which has not conventionally been studied about the use thereof at all, a satisfactory level from an industrial and economical viewpoint can be achieved without causing the load of purification of hydrogen peroxide to be large and without needing too large facilities for production.

MODE FOR CARRYING OUT THE INVENTION

Hereinbelow, the method for producing hydrogen peroxide of the present invention will be described in detail.

The present invention is characterized by reacting hydrogen and oxygen with each other in a reaction medium in the presence of a noble metal catalyst and a radical scavenger.

<Radical Scavenger>

In conventional direct synthesis methods for hydrogen peroxide, such as an anthraquinone method, the noble metal catalyst has both activity in the formation of hydrogen peroxide and activity in a decomposition reaction, and therefore it is important to inhibit the decomposition. The mechanism of the decomposition of hydrogen peroxide resides in the generation of OH radicals caused due to cleavage of an oxygen-oxygen bond of hydrogen peroxide. The generation of OH radicals abstracts hydrogen radicals of hydrogen peroxide present circumferentially, so that a chain reaction of decomposition of hydrogen peroxide proceeds.

The present inventors considered that capturing the OH radicals generated by the above reaction could inhibit progress of the decomposition of hydrogen peroxide present circumferentially, and thus that the use of a radical scavenger could inhibit the decomposition of hydrogen peroxide.

It is presumed that the radical scavenger captures OH radicals generated from decomposition of hydrogen peroxide on the surface of a noble metal catalyst to form a radical scavenger-OH adduct, inhibiting the decomposition reaction from spreading toward the hydrogen peroxide present circumferentially. The life of a radical scavenger is several minutes to several hours, and even a radical scavenger having a short life has an effect of delaying the chain reaction of decomposition.

As representative examples of such radical scavengers, there can be mentioned a nitrone compound, a nitroso compound, a dithiocarbamate derivative, and an ascorbic acid derivative. The radical scavenger may be in the form of a salt, or may be in the form of a hydrate when it is possible. Examples of the salts include a sodium salt and a potassium salt.

Examples of the nitrone compounds include compounds represented by the following general formulae (1) to (3).

[Chemical formula 5]

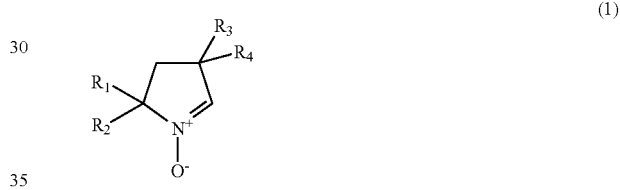

(1)

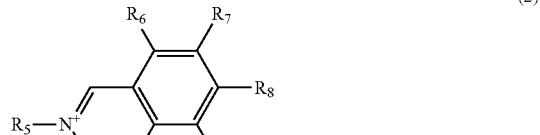

(2)

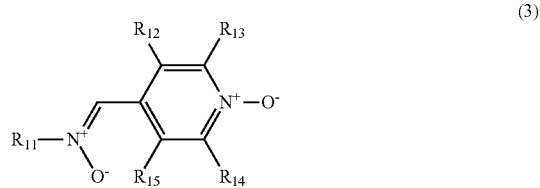

(3)

In the general formula (1), $R_1$ and $R_2$ are each independently an alkyl group having 1 to 10 carbon atoms and optionally having a branch, a phosphoric acid group, or a phosphate group.

Examples of the phosphate groups include those having various structures, and, for example, there can be mentioned one having the following structure.

[Chemical formula 6]

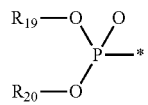

In the above formula, symbol "*" indicates a bond to the pyrroline ring, and $R_{19}$ and $R_{20}$ are each independently an alkyl group having 1 to 10 carbon atoms and optionally having a branch, or $R_{19}$ and $R_{20}$ optionally togetherform a 5- or 6-membered ring, together with O, to which they are bonded, and P, to which O is bonded, and the thus formed ring may be substituted with an alkyl group having 1 to 10 carbon atoms and optionally having a branch. From the viewpoint of easy availability of the nitrone compound, as $R_{19}$ and $R_{20}$, an alkyl group having 1 to 10 carbon atoms is preferred, an ethyl group is especially preferred, and it is also preferred that $R_{19}$ and $R_{20}$ together form a 6-membered ring, together with O, to which they are bonded, and P, to which O is bonded, and that the formed ring is optionally substituted with a methyl group.

With respect to the above-described examples, from the viewpoint of achieving an inhibition effect for decomposition of hydrogen peroxide and easy availability of the nitrone compound, in the general formula (1), $R_1$ and $R_2$ are preferably methyl groups.

Further, in the general formula (1) above, $R_3$ and $R_4$ are each independently hydrogen, an alkyl group having 1 to 10 carbon atoms and optionally having a branch, an alkyl group having 1 to 10 carbon atoms optionally having a branch and optionally being substituted with a hydroxyl group or an amino group, a 2-oxo-1-pyridylmethyl group, or an amino group. From the viewpoint of easy availability of the nitrone compound, as $R_3$ and $R_4$, a methyl group, hydrogen, a 2-oxo-1-pyridylmethyl group, and an amino group are preferred.

In the general formula (2) above, $R_5$ is an alkyl group having 1 to 10 carbon atoms and optionally having a branch. From the viewpoint of easy availability of the nitrone compound, as $R_5$, a methyl group, an ethyl group, an isopropyl group, a n-propyl group, a cyclopropyl group, a n-butyl group, a sec-butyl group, a tert-butyl group, and a cyclobutyl group are preferred.

Further, in the general formula (2), $R_6$ to $R_{10}$ are each independently hydrogen or an alkyl group having 1 to 10 carbon atoms and optionally having a branch. From the viewpoint of easy availability of the nitrone compound, $R_6$ to $R_{10}$ are preferably hydrogen.

In the general formula (3) above, $R_{11}$ is an alkyl group having 1 to 10 carbon atoms and optionally having a branch. From the viewpoint of easy availability of the nitrone compound, as $R_{11}$, a tert-butyl group is preferred.

Further, in the general formula (3), $R_{12}$ to $R_{15}$ are each independently hydrogen or an alkyl group having 1 to 10 carbon atoms and optionally having a branch.

From the viewpoint of easy availability of the nitrone compound, $R_{12}$ to $R_{15}$ are preferably hydrogen.

Next, as an example of a nitroso compound mentioned as the radical scavenger, there can be mentioned a compound represented by the following general formula (4).

[Chemical formula 7]

$$R_{16}\text{—}N\text{=}O \qquad (4)$$

In the above formula, $R_{16}$ is an alkyl group having 1 to 10 carbon atoms and optionally having a branch; or an aryl group having 6 to 20 carbon atoms and optionally being substituted with an alkyl group having 1 to 10 carbon atoms and optionally having a halogen, a sulfonic acid group, or a branch. When the aryl group is substituted with the alkyl group, the number of carbon atoms of the alkyl group is not included in the number of carbon atoms of the aryl group.

From the viewpoint of easy availability of the nitroso compound and achieving an inhibition effect for decomposition of hydrogen peroxide, as $R_{16}$, a tert-butyl group, a 3,5-dibromo-1-sulfophenyl group, and a 2,3,5,6-tetramethylphenyl group are preferred.

As an example of a dithiocarbamate derivative mentioned as the radical scavenger, there can be mentioned a compound represented by the following general formula (5).

[Chemical formula 8]

$$X^+S^-\text{—}C(\text{=}S)\text{—}NR_{17}R_{18} \qquad (5)$$

In the above formula, $R_{17}$ and $R_{18}$ are each independently an alkyl group having 1 to 10 carbon atoms, optionally having a branch and optionally being substituted with a hydroxyl group, or a carboxyalkyl group having 1 to 10 carbon atoms and optionally having a branch, and $X^+$ is a cation. The number of carbon atoms of the carboxyalkyl group includes the number of a carbon atom of the carboxyl group contained therein.

From the viewpoint of easy availability of the dithiocarbamate derivative and achieving an inhibition effect for decomposition of hydrogen peroxide, as $R_{17}$ and $R_{18}$, a methyl group, an ethyl group, and a carboxymethyl group are preferred, and as $X^+$, a sodium ion is preferred.

Next, as an example of an ascorbic acid derivative mentioned as the radical scavenger, there can be mentioned a compound represented by the following formula (6).

[Chemical formula 9]

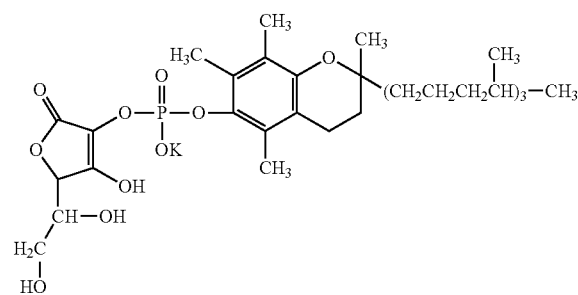

All the above-described radical scavengers are known compounds, and can be synthesized by a known method.

Further, more specific examples of the above-mentioned nitrone compounds, nitroso compounds, and dithiocarbamate derivatives include 5,5-dimethyl-1-pyrroline N-oxide (DMPO), N-tert-butyl-α-phenylnitrone (PBN), 3,3,5,5-tetramethyl-1-pyrroline N-oxide (M4PO), 2-methyl-2-nitrosopropane, 3,5-dibromo-4-nitrosobenzenesulfonate, α-(4-pyridyl-1-oxide)-N-tert-butylnitrone, 5-(diethoxyphosphoryl)-5-methyl-1-pyrroline N-oxide, 1-nitroso-2,3,5,6-tetramethylbenzene, 2-(5,5-dimethyl-2-oxo-2λ5-[1,3,2]dioxaphosphinan-2-yl)-2-methyl-3,4-dihydro-2H-pyrrole 1-oxide, 5-diethoxyphosphoryl-5-methyl-1-pyrroline N-oxide, sodium N,N-diethyldithiocarbamate trihydrate, N-(dithiocarboxy)sarcosine disodium salt dihydrate, sodium N-methyl-D-glucaminedithiocarbamate, 5,5-dimethyl-3-hydroxymethyl-1-pyrroline N-oxide (#HMDMPO), 3-(2-oxo-1-pyridylmethyl)-5,5-dimethyl-1-pyrroline N-oxide (3PM-DMPO), and 3,5,5-trimethyl-1-pyrroline N-oxide (3MDMPO).

With respect to the radical scavenger, from the viewpoint of an inhibition effect for decomposition of hydrogen peroxide, nitrone compounds are preferred, and especially preferred are 5,5-dimethyl-1-pyrroline N-oxide and N-tert-butyl-α-phenylnitrone.

Further, in the present invention, the amount of the radical scavenger used is preferably 0.01 to 0.05 part by weight, relative to 100 parts by weight of the reaction medium. The radical scavenger is more preferably used in an amount of 0.02 to 0.04 part by weight, relative to 100 parts by weight of the reaction medium.

<Halogen and Halogen Ions>

In the present invention, a halogen or halogen ions conventionally used for inhibiting the decomposition of hydrogen peroxide may be used, but from the viewpoint of the cost of purification, etc., it is preferred that they are used in such an amount that the effects of the present invention are not sacrificed, or that they are not used.

<Noble Metal Catalyst>

In the present invention, with respect to the noble metal catalyst for synthesizing hydrogen peroxide, there is no particular limitation, and a conventionally known noble metal catalyst can be used.

From the viewpoint of the catalytic activity, as the noble metal catalyst, at least one selected from the group consisting of platinum, palladium, silver, and gold is preferably used, and palladium and/or gold is more preferably used.

When a palladium/gold catalyst is used, the molar ratio of palladium to gold (palladium/gold) is preferably 0.1 to 10, more preferably 1 to 5.

For improving the catalytic efficiency and reaction efficiency, it is prefrerred that the noble metal is supported on a carrier, such as silica, alumina, silica-alumina, titanium oxide, or zirconia oxide. As a carrier, titanium oxide is preferably used.

With respect to the method for supporting the above-mentioned noble metal on the carrier, there is no particular limitation, and a conventionally known method can be employed, but preferred is an impregnation method or an ion-exchange method. As the impregnation method, for example, an evaporation-to-dryness method, an euqilibrium adsorption method, and a pore filling method can be employed.

The amount of the noble metal supported on the carrier is preferably 0.01 to 10 parts by weight, more preferably 0.05 to 5 parts by weight, relative to 100 parts by weight of the carrier. Further, in the method for producing hydrogen peroxide of the present invention, the amount of the noble metal catalyst used (or the amount of the supported catalyst when the catalyst is supported on a carrier) is, relative to 1 L of the reaction medium, preferably 1 to 100 g, more preferably 1 to 40 g.

<Reaction Medium>

The method for producing hydrogen peroxide of the present invention is generally performed in a reaction medium which is a liquid phase. With respect to the reaction medium, there is no particular limitation as long as the medium does not inhibit the reaction of hydrogen and oxygen, and any reaction medium can be used. Such a reaction medium is well-known to those skilled in the art.

Examples of the reaction media include water; alcohols such as methanol and ethanol; ketones such as acetone; and mixed solvents thereof. Of these, preferred are water and the alcohols.

Further, the reaction medium may contain an additive for, for example, adjusting pH, achieving a stabilizer effect, or improving the gas dissolving property, and, may contain an acid such as phosphoric acid or sulfuric acid, or a fluorine inert liquid, etc. When the reaction medium contains the additive, the weight of the contained additive is included in the weight of the reaction medium.

<Reaction Conditions>

In the present invention, hydrogen and oxygen are directly reacted in the above-described reaction medium in the presence of the above radical scavenger to synthesize hydrogen peroxide.

In this reaction, by employing a high pressure, the yield of hydrogen peroxide can be increased, and therefore the reaction is generally conducted using a reaction apparatus having a pressure resistance, such as an autoclave.

The reaction apparatus of any type, for example, of an agitated vessel type, a bubble column type, a fixed bed type, or a microreactor type can be used, and the reaction can be conducted either in a batchwise manner or in a continuous manner. The reaction apparatus has a gas introducing portion and a gas discharging portion, and further generally has, a thermometer and a pressure gauge, etc.

In the reaction in the present invention, a corrosive halogen may be used, and therefore a reaction apparatus formed from stainless steel, Inconel, or Hastelloy lined with Teflon (registered trademark) is preferably used. On the other hand, in the present invention, hydrogen peroxide can be produced without using a halogen, and therefore an inexpensive reaction apparatus formed from stainless steel or glass lining can be used, which is advantageous from an economical viewpoint.

In the present invention, during the synthesis of hydrogen peroxide, the reaction temperature for hydrogen and oxygen is preferably 0 to 100° C., especially preferably in the range of from 5 to 50° C. With respect to the pressure for the reaction, there is no particular limitation, but it is preferably atmospheric pressure to 10 MPa, especially preferably atmospheric pressure to 2 MPa. The reaction time is generally 0.01 to 100 hours, preferably 0.5 to 10 hours.

The flow rates of hydrogen gas and oxygen gas preferably have a ratio such that the explosive range is avoided and oxygen is excess relative to hydrogen (for example, a ratio between the flow rates of hydrogen gas and oxygen gas is 1:2 to 1:10, in terms of a volume ratio). Further, from the viewpoint of the safety, for further reducing the danger of explosion, it is preferred that hydrogen and oxygen are diluted.

In this case, usable diluting gas is an inert gas that does not affect the reaction of hydrogen and oxygen, and, for example, nitrogen gas, argon gas, and helium gas can be used. From the viewpoint of the cost, preferred is nitrogen gas. Oxygen may be diluted with compressed air and used in the form of oxygen mixture gas.

Further, from the viewpoint of the reaction efficiency, the above gas is generally introduced into a liquid phase, i.e., a reaction solution.

The radical scavenger may be preliminarily dissolved in the reaction medium, which is then introduced into the reaction apparatus, or the reaction medium and the radical scavenger may be individually and successively introduced into the reaction apparatus.

EXAMPLES

Hereinbelow, the present invention will be described in more detail with reference to the following Examples and Comparative Examples, which should not be construed as limiting the scope of the present invention to Examples.

In the following Examples and Comparative Examples, various evaluations including the yield of hydrogen peroxide were conducted as follows.

(1) The rate of the reaction of hydrogen was determined from the following formula.

> Rate of reaction of hydrogen=(Amount of the hydrogen consumed)÷(Total amount of the hydrogen fed)

The amount of the hydrogen consumed was determined by measuring the amount of the hydrogen remaining unreacted by gas chromatography (apparatus used: trade name: "GC-8A"; manufactured by Shimadzu Corporation), and subtracting the measured amount from the total amount of the hydrogen fed.

(2) The selectivity for hydrogen peroxide was determined from the following formula.

> Selectivity for hydrogen peroxide=[(Mole of the hydrogen peroxide generated by the reaction)÷(Theoretical mole of the generated hydrogen peroxide calculated from the amount of the hydrogen consumed)]

The mole of the hydrogen peroxide formed was determined by taking out a portion of the reaction solution after completion of the synthesis reaction of hydrogen peroxide, and measuring the mole using titanyl sulfate as a color former for hydrogen peroxide with use of an ultraviolet-visible spectrophotometer (trade name: V-550; manufactured by JASCO Corporation).

(3) The yield of hydrogen peroxide was determined from the following formula.

> Yield of hydrogen peroxide=(Rate of reaction of hydrogen)×(Selectivity for hydrogen peroxide)

The results of the above evaluations made with respect to the Examples and Comparative Examples are shown in Table 1 below.

Example 1

To 200 ml of a mixed solvent of ethanol and water (water:ethanol=1:1) was added 2 g of oxalic acid, and the resultant mixture was stirred. To the mixture were added 10 g of titania manufactured by Sakai Chemical Industry Co., Ltd., 0.05 g of $HAuCl_4$, and 0.12 g of $PdCl_2$, and the resultant mixture was refluxed at 80° C. using a Liebig condenser for one hour.

After a lapse of one hour, the resultant suspension was transferred to a 300 ml beaker, and heated to remove the solvent. Then, the resultant solids were dried in a dryer at 85° C. for 2 days, and controlled in particle size so as to have a size of 0.5 to 1.8 mm, and used in the experiment.

In the experiment, to a 270 ml autoclave lined with Teflon (registered trademark), having a stirrer and a gas feeding pipe, were added 1.125 g of the above-produced Au/Pd-supported titania catalyst and 270 ml of a reaction solution (which contains 0.5 mM phosphoric acid and 2 mM DMPO (5,5-dimethyl-1-pyrroline N-oxide), and uses water as a reaction medium).

While controlling the temperature in the autoclave at 10° C. and feeding gas into the autoclave at a rate of 150 ml/min (hydrogen: 4%; oxygen: 19.5%; nitrogen: 76.5%), the pressure was adjusted to 1 MPa, and a reaction was effected for 2 hours while stirring at a rotational speed of 800 rpm.

Example 2

An Au/Pd-supported titania catalyst was produced in the same manner as in Example 1.

In the experiment, to a 270 ml autoclave lined with Teflon (registered trademark), having a stirrer and a gas feeding pipe, were added 1.125 g of the above-produced Au/Pd-supported titania catalyst and 270 ml of a reaction solution (which contains 0.5 mM phosphoric acid and 2 mM PBN (N-tert-butyl-α-phenylnitrone), and uses water as a reaction medium).

While controlling the temperature in the autoclave at 10° C. and feeding gas into the autoclave at a rate of 150 ml/min (hydrogen: 4%; oxygen: 19.5%; nitrogen: 76.5%), the pressure was adjusted to 1 MPa, and a reaction was effected for 2 hours while stirring at a rotational speed of 800 rpm.

Example 3

An Au/Pd-supported titania catalyst was produced in the same manner as in Example 1.

In the experiment, to a 270 ml autoclave lined with Teflon (registered trademark), having a stirrer and a gas feeding pipe, were added 1.125 g of the above-produced Au/Pd-supported titania catalyst and 270 ml of a reaction solution (which contains 0.5 mM phosphoric acid and 4 mM DMPO, and uses water as a reaction medium).

While controlling the temperature in the autoclave at 10° C. and feeding gas into the autoclave at a rate of 150 ml/min (hydrogen: 4%; oxygen: 19.5%; nitrogen: 76.5%), the pressure was adjusted to 1 MPa, and a reaction was effected for 2 hours while stirring at a rotational speed of 800 rpm.

Example 4

An Au/Pd-supported titania catalyst was produced in the same manner as in Example 1.

In the experiment, to a 270 ml autoclave lined with Teflon (registered trademark), having a stirrer and a gas feeding pipe, were added 1.125 g of the above-produced Au/Pd-supported titania catalyst and 270 ml of a reaction solution (which contains 0.5 mM phosphoric acid and 2 mM DMPO, and uses ethanol as a reaction medium).

While controlling the temperature in the autoclave at 10° C. and feeding gas into the autoclave at a rate of 150 ml/min (hydrogen: 4%; oxygen: 19.5%; nitrogen: 76.5%), the pressure was adjusted to 1 MPa, and a reaction was effected for 2 hours while stirring at a rotational speed of 800 rpm.

Comparative Example 1

An Au/Pd-supported titania catalyst was produced in the same manner as in Example 1.

In the experiment, to a 270 ml autoclave lined with Teflon (registered trademark), having a stirrer and a gas feeding pipe, were added 1.125 g of the above-produced Au/Pd-supported titania catalyst and 270 ml of a reaction solution (which contains 0.5 mM phosphoric acid, and uses water as a reaction medium).

While controlling the temperature in the autoclave at 10° C. and feeding gas into the autoclave at a rate of 150 ml/min (hydrogen: 4%; oxygen: 19.5%; nitrogen: 76.5%), the pressure was adjusted to 1 MPa, and a reaction was effected for 2 hours while stirring at a rotational speed of 800 rpm.

Comparative Example 2

An Au/Pd-supported titania catalyst was produced in the same manner as in Example 1.

In the experiment, to a 270 ml autoclave lined with Teflon (registered trademark), having a stirrer and a gas feeding pipe, were added 1.125 g of the above-produced Au/Pd-supported titania catalyst and 270 ml of a reaction solution (which contains 0.5 mM phosphoric acid and 2 mM NaBr, and uses water as a reaction medium).

While controlling the temperature in the autoclave at 10° C. and feeding gas into the autoclave at a rate of 150 ml/min (hydrogen: 4%; oxygen: 19.5%; nitrogen: 76.5%), the pressure was adjusted to 1 MPa, and a reaction was effected for 2 hours while stirring at a rotational speed of 800 rpm.

The results of the various evaluations including the yield of hydrogen peroxide made with respect to the above Examples and Comparative Examples are shown in Table 1 below.

TABLE 1

| | Decomposition inhibitor (Concentration) | Rate of $H_2$ reaction (%) | Selectivity for $H_2O_2$ (%) | Yield of $H_2O_2$ (%) |
|---|---|---|---|---|
| Example 1 | DMPO (2 mM) | 63.7 | 63.8 | 40.6 |
| Example 2 | PBN (2 mM) | 68.7 | 56.9 | 39.1 |
| Example 3 | DMPO (4 mM) | 68.6 | 65.4 | 44.8 |
| Example 4 | DMPO (2 mM) | 92.5 | 40.8 | 37.7 |
| Comparative example 1 | None | 63.1 | 23.0 | 14.5 |
| Comparative example 2 | Br$^-$ (2 mM) | 49.2 | 96.5 | 47.5 |

As is apparent from the results shown in Table 1, by the method for producing hydrogen peroxide of the present invention using a radical scavenger (Examples 1 to 4), hydrogen peroxide can be efficiently produced without using a halogen as an inhibitor of decomposition. Accordingly, an increase of the cost due to necessity of purification for removing the halogen can be suppressed, and industrial significance was acknowledged on the present invention.

The invention claimed is:

1. A method for producing hydrogen peroxide, comprising reacting hydrogen and oxygen in a reaction medium in the presence of a noble metal catalyst and a radical scavenger to produce hydrogen peroxide,
   wherein the reaction medium is free of halogen ions, and
   wherein the radical scavenger is capable of capturing OH radicals generated from decomposition of the hydrogen peroxide and forming a radical scavenger-OH adduct and is a nitrone compound of formula (1), (2), or (3), a nitroso compound of formula (4), a dithiocarbamate derivative of formula (5), or a compound of formula (6):

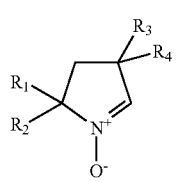

(1)

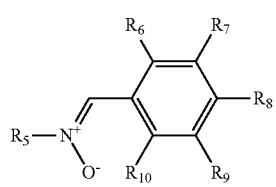

(2)

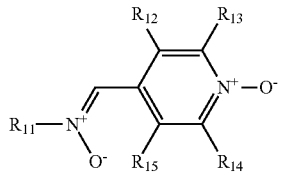

(3)

(4)

(5)

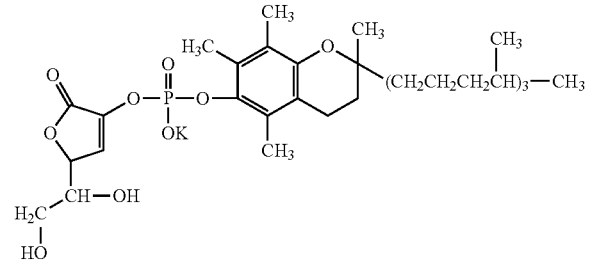

(6)

wherein, in formula (1), $R_1$ and $R_2$ are each independently an alkyl group having 1 to 10 carbon atoms and optionally having a branch, a phosphoric acid group, or a phosphate group, and $R_3$ and $R_4$ are each independently hydrogen, an alkyl group having 1 to 10 carbon atoms and optionally having a branch, an alkyl group having 1 to 10 carbon atoms optionally having a branch and optionally being substituted with a hydroxyl group or an amino group, a 2-oxo-1-pyridylmethyl group, or an amino group, in formula (2), $R_5$ is an alkyl group having 1 to 10 carbon atoms and optionally having a branch, and $R_6$ to $R_{10}$ are each independently hydrogen or an alkyl group having 1 to 10 carbon atoms and optionally having a branch, in formula (3), $R_{11}$ is an alkyl group having 1 to 10 carbon atoms and optionally having a branch, and $R_{12}$ to $R_{15}$ are each independently hydrogen or an alkyl group having 1 to 10 carbon atoms and optionally having a branch, in formula (4), $R_{16}$ is an alkyl group having 1 to 10 carbon atoms and optionally having a branch, or an aryl group having 6 to 20 carbon atoms and optionally being substituted with an alkyl group having 1 to 10 carbon atoms and optionally having a halogen, a sulfonic acid group, or a branch, and in formula (5), $R_{17}$ and $R_{18}$ are each independently an alkyl group having 1 to 10 carbon atoms optionally having a branch and optionally being substituted with a hydroxyl group, or a carboxyalkyl group having 1 to 10 carbon atoms and optionally having a branch, and $X^+$ is a cation.

2. The method according to claim 1, wherein the radical scavenger is a nitrone compound of formula (1).

3. The method according to claim 1, wherein, in formula (1), $R_1$ and $R_2$ are methyl groups, and $R_3$ and $R_4$ are each independently a methyl group, hydrogen, a 2-oxo-1-pyridylmethyl group, or an amino group, in formula (2), $R_5$ is a methyl group, an ethyl group, an isopropyl group, a n-propyl group, a cyclopropyl group, a n-butyl group, a sec-butyl group, a tert-butyl group, or a cyclobutyl group, and $R_6$ to $R_{10}$ are hydrogen, in formula (3), $R_{11}$ is a tert-butyl group, and $R_{12}$ to $R_{15}$ are hydrogen, in formula (4), $R_{16}$ is a tert-butyl group, a 3,5-dibromo-1-sulfophenyl group, or a 2,3,5,6-tetramethylphenyl group; and in formula (5), each of $R_{17}$ and $R_{18}$ is independently a methyl group, an ethyl group, or a carboxymethyl group, and $X^+$ is a sodium ion.

4. The method according to claim 1, wherein the radical scavenger is 5,5-dimethyl-1-pyrroline N-oxide or N-tert-butyl-α-phenylnitrone.

5. The method according to claim 1, wherein an amount of the radical scavenger is from 0.01 to 0.05 part by weight, relative to 100 parts by weight of the reaction medium.

6. The method according to claim 1, wherein the noble metal catalyst is a catalyst comprising silica, alumina, silica-alumina, titanium oxide, or zirconia oxide having supported thereon at least one metal selected from the group consisting of platinum, palladium, silver, and gold.

7. The method according to claim 3, wherein an amount of the radical scavenger is from 0.01 to 0.05 part by weight, relative to 100 parts by weight of the reaction medium.

8. The method according to claim 4, wherein an amount of the radical scavenger is from 0.01 to 0.05 part by weight, relative to 100 parts by weight of the reaction medium.

9. The method according to claim 3, wherein the noble metal catalyst is a catalyst comprising silica, alumina, silica-alumina, titanium oxide, or zirconia oxide having supported thereon at least one metal selected from the group consisting of platinum, palladium, silver, and gold.

10. The method according to claim 4, wherein the noble metal catalyst is a catalyst comprising silica, alumina, silica-alumina, titanium oxide, or zirconia oxide having supported thereon at least one metal selected from the group consisting of platinum, palladium, silver, and gold.

11. The method according to claim 5, wherein the noble metal catalyst is a catalyst comprising silica, alumina, silica-alumina, titanium oxide, or zirconia oxide having supported thereon at least one metal selected from the group consisting of platinum, palladium, silver, and gold.

12. The method according to claim 7, wherein the noble metal catalyst is a catalyst comprising silica, alumina, silica-alumina, titanium oxide, or zirconia oxide having supported thereon at least one metal selected from the group consisting of platinum, palladium, silver, and gold.

13. The method according to claim 8, wherein the noble metal catalyst is a catalyst comprising silica, alumina, silica-alumina, titanium oxide, or zirconia oxide having supported thereon at least one metal selected from the group consisting of platinum, palladium, silver, and gold.

14. The method according to claim 1, wherein the radical scavenger is a nitrone compound of formula (2).

15. The method according to claim 1, wherein the radical scavenger is a nitrone compound of formula (3).

16. The method according to claim 1, wherein the radical scavenger is a nitroso compound of formula (4).

17. The method according to claim 1, wherein the radical scavenger is a dithiocarbamate derivative of formula (5).

18. The method according to claim 1, wherein the radical scavenger is a compound of formula (6).

* * * * *